H. G. HERGELROTH.
FOLDING TENT.
APPLICATION FILED FEB. 9, 1911.
1,008,331.
Patented Nov. 14, 1911.
2 SHEETS—SHEET 1.
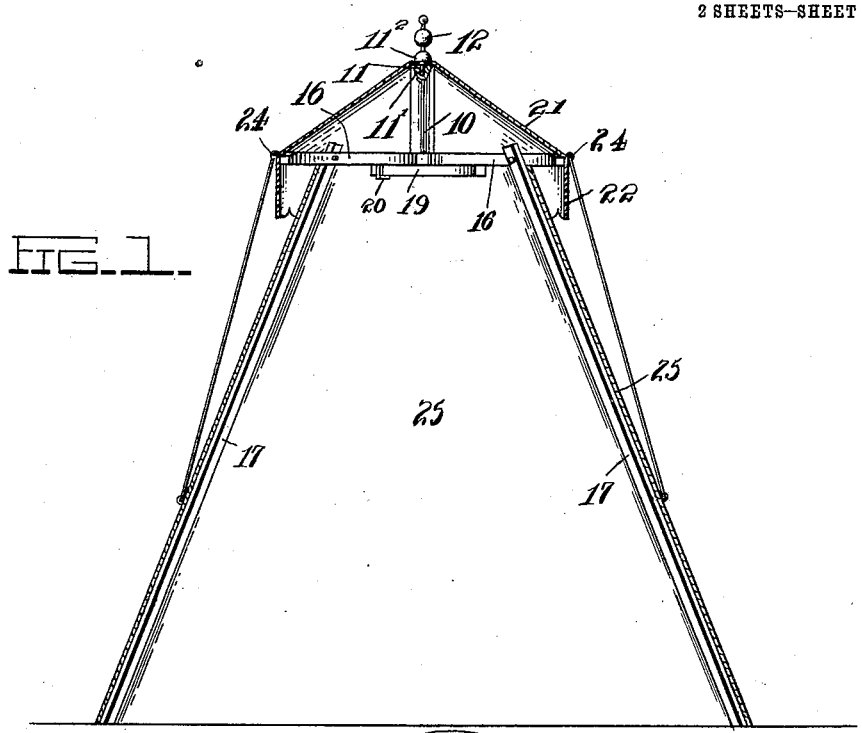
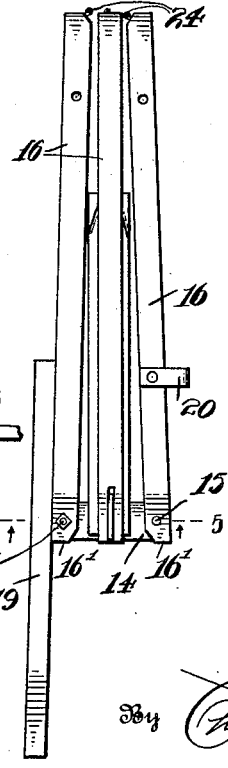
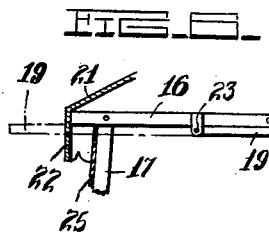
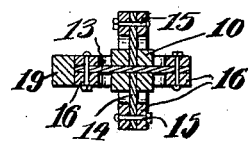
Witnesses
Inventor
Harry G. Hergelroth.
By
Attorneys H. G. HERGELROTH.
FOLDING TENT.
APPLICATION FILED FEB. 9, 1911.
1,008,331.
Patented Nov. 14, 1911.
2 SHEETS—SHEET 2.
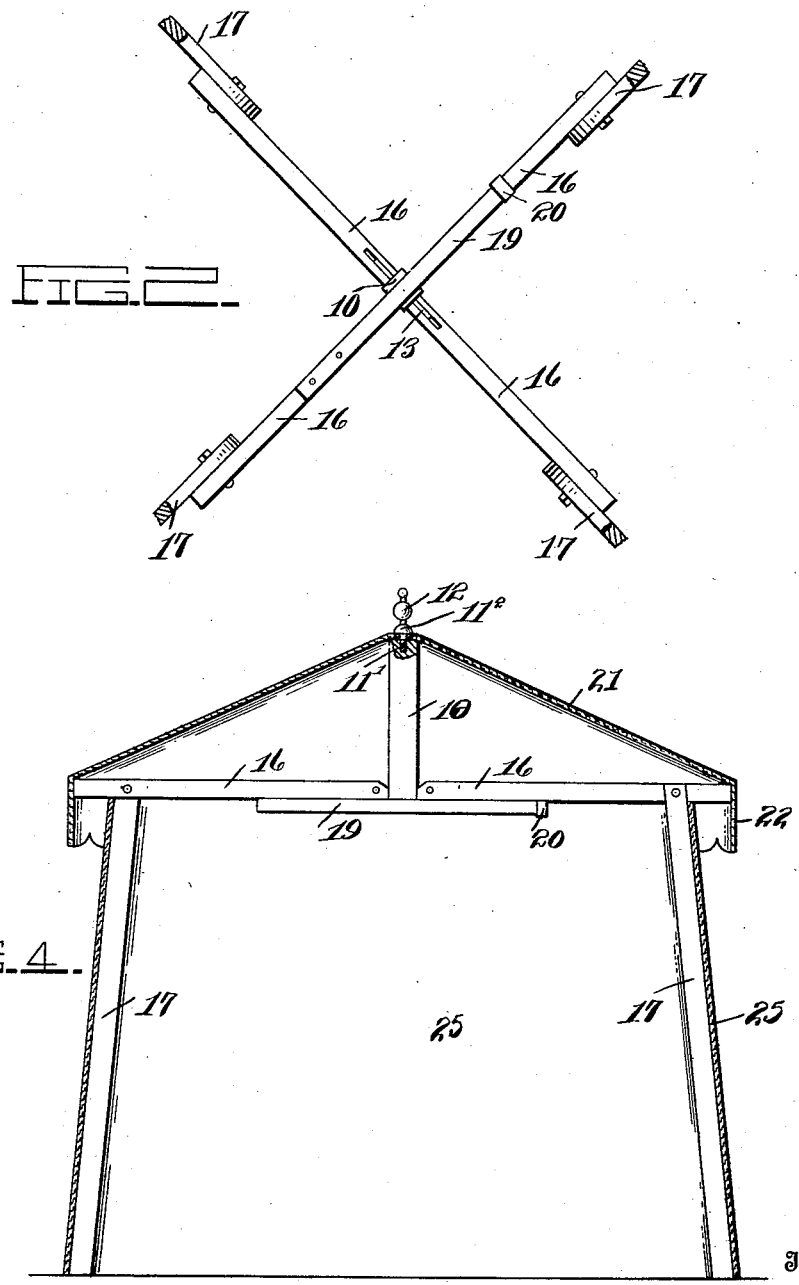

UNITED STATES PATENT OFFICE.

HARRY G. HERGELROTH, OF MIDDLETOWN, PENNSYLVANIA.

FOLDING TENT.

1,008,331. Specification of Letters Patent. Patented Nov. 14, 1911.

Application filed February 9, 1911. Serial No. 607,500.

*To all whom it may concern:*

Be it known that I, HARRY G. HERGELROTH, a citizen of the United States, residing at Middletown, in the county of Dauphin, State of Pennsylvania, have invented certain new and useful Improvements in Folding Tents; and I do hereby declare the following to be a full, clear, and exact description of the invention, such as will enable others skilled in the art to which it appertains to make and use the same.

This invention relates to tents and canopies.

The primary object of the invention is to provide a folding structure for supporting the canvas in such a manner as to dispense with the central support which ordinarily extends from the top of the tent to the ground.

With the above and other objects in view the invention consists in certain constructions, combinations and arrangements of parts, clearly described in the following specification and clearly illustrated in the accompanying drawings.

In the drawings:—Figure 1 is a view showing the supporting device arranged within a tent, one wall of the tent being removed to show the construction. Fig. 2 is a bottom plan view. Fig. 3 is a view of the supporting structure folded. Fig. 4 is a view showing a slightly modified form of support which is arranged to coact with a similar support and which is adapted for use in connection with a rectangular tent. Fig. 5 is a section on the line 5—5 of Fig. 3. Fig. 6 is a detail fragmentary elevation of one of the rafters for showing the latch member hingedly attached thereto and in dotted lines in a folded position.

In the drawings, 10 designates the standard or upright pole which in the preferred form of the invention is adapted to centrally support the top of the tent. This support 10 has formed in its end portion a screw threaded aperture 11 which receives the shank 11' of a cap 12, said shank passing through a gromet arranged centrally in the top of the tent, the flange 11'' of said cap holding the tent in contact with the end portion of the standard.

In the preferred form of the device the standard is provided with plates 13 and 14 which project beyond the standard and which are provided with suitable perforations, each of which receives a bolt 15 forming a pivot for a beam or rafter 16, said plates entering apertures in the end portions of said rafters, said end portions being curved to permit said rafters to swing in the position shown in Fig. 3, the portion 16' of the rafters contacting with the standards to hold the same at right angles to said standard, when in their extended position. Each rafter is provided at a point adjacent its end portion with a pivotally supported strut 17 which as the tent is set up extends at an angle to the rafter, the tent being thus supported without the end portions of said struts entering the ground.

To one of the rafters is secured a latch member 19 which when the device is set up extends across the base of the standard and lies flush with the under face of one of the other rafters, said other rafters being provided with the pivotally supported U-shaped member 20 which embraces the end portion of the latch member holding the same against movement, the standard 10 in this way being supported as though the latch carrying rafter and the latch receiving rafter were a single integral beam.

It will thus be seen that the standard forms a rigid support for the central portion of the tent being held against folding in one direction by the peculiar formation of the end portions of the rafters and in the other by the latch member which locks two of the rafter members together. Attention is called to the fact that while the latch member is shown as rigidly secured to the rafter, the same could be hinged as shown at 23 in Fig. 6 of the drawings, in order to facilitate the folding of the structure.

The tent is formed in two sections, a single piece of material 21 forming the top which as before stated is secured to the end portion of the standard. This material 21 is also provided with four spaced gromets, arranged adjacent its edge through which extend screw eyes 24 which enter the outer end portions of the rafters 16 thus properly extending the material 21 which is of such a length as to form a drop 22 which falls below the end portions of the rafters. The walls of the tent consist of one or more pieces of material 25 which are secured to the struts 17, said walls extending within the top portion 21 being overlapped by the drop formed on said top portion thus permitting the tent to be properly ventilated, air passing under the drop and over the side wall.

It will be seen by this construction that the tent is supported without the use of the central pole which usually extends from the top of the tent to the ground, the present construction thus allowing the occupants of the tent to utilize the entire floor space inclosed by the tent walls without danger of contacting with the supporting structure.

In setting the device up the struts are spread as shown in Fig. 1, the standard pushed up and the latch member secured in position. In the use of this structure, the struts need not enter the ground, the angle at which the same extend supporting the tent in such a manner that guy ropes are unnecessary, thus permitting the device to be set up in a nursery, or on a lawn without disfiguring the carpet or the ground, attention being called to the fact that the interior of the tent is ventilated by the spacing of its top portion from the side walls. The structure being such however as to prevent rain from entering through the air passage thus formed.

In the modification shown the standard is provided with but two rafters connected to the central standard 10 in the manner as shown in Fig. 4 being used to support a rectangular tent, the construction and operation of the latch member being the same.

The many advantages of a construction of this character will be clearly apparent as the same forms a convenient and effective support which may be readily folded for transportation.

I claim:—

1. In a folding tent, a standard, a plurality of rafters pivotally supported by the lower end of said standard, a latch member carried by one of said rafters, means for removably securing the end portion of said member to another of said rafters, said latch member contacting with the base of said standard.

2. In a folding tent, a standard, a plurality of plates passing transversely through said standard, rafters pivotally supported by the end portions of said plates, said rafters lying at right angles to said standard when in their extreme extended position, and means for locking said rafters in said extended position, said means comprising a bar secured to two opposed rafters beneath the lower end of the standard to support the same.

3. In a folding tent, a standard, a plurality of plates extending transversely through said standard at a point adjacent one of its ends, a plurality of rafters pivotally attached to said plates, struts pivotally secured at points adjacent the end portions of said rafters, and means contacting with the base of said standard beneath certain of said rafters to hold said rafters in their extended position.

4. In a folding tent having side walls and a top portion, a standard arranged to extend from a point in a plane with the upper edge of the side walls of the tent, one end of said standard supporting the top portion of said tent, a plurality of rafters pivotally supported by said standard, and means carried by said rafters for locking the same at right angles to said standard, said means holding the rafters rigid and contacting with the lower end of the standard.

5. In a folding tent having a top, a standard, one end of said standard arranged to contact with the central portion of the tent top, means for retaining the central portion of the tent top to the upper end of the standard, a plurality of rafters pivotally supported by said standard at its lower end, the top of said tent being supported adjacent its edge by the end portions of said rafters and depending therefrom, the lower portion of the tent being spaced inwardly of the depending portion, means mounted upon commonly extended rafters for locking said rafters at right angles to said standard, a plurality of struts connected to said rafters at points removed from their edge portions, said struts supporting the side walls of said tent and means for securing the edges of the top to the ends of the rafters.

In testimony whereof, I affix my signature, in presence of two witnesses.

HARRY G. HERGELROTH.

Witnesses:
  JOHN J. SCHRAEDLEY,
  GEORGE H. SCHADT.

---

Copies of this patent may be obtained for five cents each, by addressing the " Commissioner of Patents, Washington, D. C."